(12) United States Patent
Hahn

(10) Patent No.: US 12,108,421 B2
(45) Date of Patent: Oct. 1, 2024

(54) RESOURCE ALLOCATION METHOD IN SIDELINK COMMUNICATION

(71) Applicants: Hyundai Motor Company, Seoul (KR); Kia Corporation, Seoul (KR)

(72) Inventor: Gene Back Hahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 327 days.

(21) Appl. No.: 17/624,998

(22) PCT Filed: May 13, 2020

(86) PCT No.: PCT/KR2020/006283
§ 371 (c)(1),
(2) Date: Jan. 5, 2022

(87) PCT Pub. No.: WO2021/006473
PCT Pub. Date: Jan. 14, 2021

(65) Prior Publication Data
US 2022/0287024 A1    Sep. 8, 2022

Related U.S. Application Data

(60) Provisional application No. 62/871,025, filed on Jul. 5, 2019.

(30) Foreign Application Priority Data

May 12, 2020 (KR) ........................ 10-2020-0056700

(51) Int. Cl.
*H04W 72/51* (2023.01)
*H04W 72/23* (2023.01)
*H04W 92/18* (2009.01)

(52) U.S. Cl.
CPC .......... *H04W 72/51* (2023.01); *H04W 72/23* (2023.01); *H04W 92/18* (2013.01)

(58) Field of Classification Search
CPC ..... H04W 72/51; H04W 72/23; H04W 92/18; H04W 76/14; H04W 4/40
See application file for complete search history.

(56) References Cited

U.S. PATENT DOCUMENTS

2019/0021040 A1    1/2019  Chae et al.
2019/0116586 A1*   4/2019  Basu Mallick ....... H04W 64/00
(Continued)

FOREIGN PATENT DOCUMENTS

KR    2018-0098413 A        9/2018
WO    WO-2017136001 A1 *    8/2017  .......... H04W 72/048

OTHER PUBLICATIONS

Huawei et al. Discussion on sidelink resource allocation mode 1. R1-1906010. 3GPP TSG RAN WG1 Meeting #97. Reno, USA. May 3, 2019 See section 3.1; and figure 4.
(Continued)

*Primary Examiner* — Chae S Lee
(74) *Attorney, Agent, or Firm* — Fox Rothschild LLP

(57) ABSTRACT

Disclosed is a resource allocation method in sidelink communication. An operation method of a terminal includes the steps of: receiving a first message, including mobility conditions to be used for selecting a resource allocation mode for sidelink communication, from a base station; selecting the resource allocation mode to be applied to the terminal, the selection being made on the basis of the results of a comparison between the mobility of the terminal and the mobility conditions; determining a resource pool on the basis of the selected resource allocation mode; and performing the sidelink communication by using the determined
(Continued)

resource pool. Accordingly, the performance of a communication system can be enhanced.

8 Claims, 7 Drawing Sheets

(56) References Cited

U.S. PATENT DOCUMENTS

2020/0196353 A1* 6/2020 Zhang ................... H04W 4/023
2020/0337067 A1* 10/2020 Chae ................... H04W 72/569
2021/0345346 A1* 11/2021 Peng ................... H04W 72/542

OTHER PUBLICATIONS

Mediatek Inc. NR sidelink mode-1 resource allocation. R1-1906554. 3GPP TSG RAN WG1 Meeting #97. Reno, USA. May 4, 2019 See section 2.4.
Ericsson. Resource configuration per validity area. R2-1907356. 3GPP TSG-RAN WG2 Meeting #106. Reno, USA. May 2, 2019 See section 2.
Nokia et al. Discussion of Resource Allocation for Sidelink-Mode 1. R1-1906075. 3GPP TSG RAN Wel Meeting #97. Reno, USA. May 4, 2019 See section 2.1.

* cited by examiner

RESOURCE ALLOCATION METHOD IN SIDELINK COMMUNICATION

CROSS-REFERENCE TO RELATED APPLICATIONS

This application is a National Phase application filed under 35 USC 371 of PCT International Application No. PCT/KR2020/006283 with an International Filing Date of May 13, 2020, which claims priority from U.S. Provisional Application 62/871,025 filed on Jul. 5, 2019 and Korea Application 10-2020-0056700 filed on May 12, 2020. The entire contents of these applications are incorporated herein by reference in their entirety.

BACKGROUND

(a) Technical Field

The present disclosure relates to a sidelink communication technique, more particularly, to a technique for allocating sidelink resources based on a speed of a terminal.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

Meanwhile, zones may be configured, and sidelink resources (e.g., resource pool) for each of the zones may be configured. Here, a zone may be a geographic zone. A terminal located in a specific zone may perform sidelink communication using resources mapped to the specific zone. Information on the resources mapped to the specific zone may be transmitted from a base station to the terminal. When the terminal moves at a high speed, a zone to which the terminal belongs may be changed. For example, the zone to which the terminal belongs may be changed from a zone #1 to a zone #2. In a state in which information on resources mapped to the zone #2 is not obtained from the base station, the terminal located in the zone #2 may perform sidelink communication using resources mapped to the previous zone (i.e., zone #1). In this case, the performance of sidelink communication may be degraded, and methods for solving this may be required.

SUMMARY

An objective of the present disclosure for solving the above-described problem is to provide a method for allocating resources in sidelink communication by considering a speed of a terminal.

An operation method of a terminal, according to a first exemplary embodiment of the present disclosure for achieving the objective, may comprise: receiving, from a base station, a first message including mobility conditions used to select a resource allocation scheme for sidelink communication; selecting a resource allocation scheme applied to the terminal based on a result of comparing a mobility of the terminal and the mobility conditions; determining a resource pool based on the selected resource allocation scheme; and performing the sidelink communication using the determined resource pool, wherein the resource allocation scheme is classified into a type1-resource allocation scheme and a type2-resource allocation scheme, and wherein in the type1-resource allocation scheme, the resource pool is configured based on an area including a plurality of zones, and in the type2-resource allocation scheme, the resource pool is configured based on a zone.

The mobility of the terminal may be a speed; when a speed of the terminal satisfies a mobility condition for applying the type1-resource allocation scheme among the mobility conditions, the selected resource allocation scheme may be the type1-resource allocation scheme; and when the speed of the terminal satisfies a mobility condition for applying the type2-resource allocation scheme among the mobility conditions, the selected resource allocation scheme may be the type2-resource allocation scheme.

The mobility of the terminal may be a speed change; when a speed change of the terminal satisfies a mobility condition for applying the type1-resource allocation scheme among the mobility conditions, the selected resource allocation scheme may be the type1-resource allocation scheme; and when the speed change of the terminal satisfies a mobility condition for applying the type2-resource allocation scheme among the mobility conditions, the selected resource allocation scheme may be the type2-resource allocation scheme.

The first message may further include one or more of a list of zones belonging to each of areas and a speed threshold.

The operation method may further comprise receiving, from the base station, a second message including first mapping information between areas and resource pools and second mapping information between zones and resource pools, wherein the resource pool used for the sidelink communication is determined based on the first mapping information or the second mapping information.

The operation method may further comprise transmitting, to the base station, a third message including at least one of information indicating the selected resource allocation scheme, an identifier of a zone to which the terminal belongs, an identifier of an area to which the terminal belongs, the determined resource pool, or combinations thereof.

An operation method of a base station, according to a second exemplary embodiment of the present disclosure for achieving the objective, may comprise: transmitting, to a terminal, a first message including mobility conditions used to select a resource allocation scheme for sidelink communication; and transmitting, to the terminal, a second message including first mapping information between areas and resource pools and second mapping information between zones and the resource pools, each of the areas including a plurality of zones, wherein the resource allocation scheme is classified into a type1-resource allocation scheme and a type2-resource allocation scheme, and wherein in the type1-resource allocation scheme, the resource pool is configured based on an area including a plurality of zones, and in the type2-resource allocation scheme, the resource pool is configured based on a zone.

The operation method may further comprise receiving, from the base station, a third message including information indicating a resource allocation scheme selected by the terminal based on a result of comparing a mobility of the terminal and the mobility conditions.

The mobility of the terminal may be a speed; when a speed of the terminal satisfies a mobility condition for applying the type1-resource allocation scheme among the mobility conditions, the selected resource allocation scheme may be the type1-resource allocation scheme; and when the speed of the terminal satisfies a mobility condition for applying the type2-resource allocation scheme among the mobility conditions, the selected resource allocation scheme may be the type2-resource allocation scheme.

The mobility of the terminal may be a speed change; when a speed change of the terminal satisfies a mobility condition for applying the type1-resource allocation scheme among the mobility conditions, the selected resource allocation scheme may be the type1-resource allocation scheme; and when the speed change of the terminal satisfies a mobility condition for applying the type2-resource allocation scheme among the mobility conditions, the selected resource allocation scheme may be the type2-resource allocation scheme.

An operation method of a terminal, according to a third exemplary embodiment of the present disclosure for achieving the objective, may comprise: transmitting, to a base station, a first message including mobility information of the terminal; receiving, from the base station, a second message including information indicating a resource allocation scheme selected based on a result of comparing the mobility information and mobility conditions; determining a resource pool for sidelink communication based on the resource allocation scheme; and performing the sidelink communication using the resource pool, wherein the resource allocation scheme is classified into a type1-resource allocation scheme and a type2-resource allocation scheme, and wherein in the type1-resource allocation scheme, the resource pool is configured based on an area including a plurality of zones, and in the type2-resource allocation scheme, the resource pool is configured based on a zone.

The mobility of the terminal may be a speed; when a speed of the terminal satisfies a mobility condition for applying the type1-resource allocation scheme among the mobility conditions, the resource allocation scheme selected by the base station may be the type1-resource allocation scheme; and when the speed of the terminal satisfies a mobility condition for applying the type2-resource allocation scheme among the mobility conditions, the resource allocation scheme selected by the base station may be the type2-resource allocation scheme.

The mobility of the terminal may be a speed change; when a speed change of the terminal satisfies a mobility condition for applying the type1-resource allocation scheme among the mobility conditions, the resource allocation scheme selected by the base station may be the type1-resource allocation scheme; and when the speed change of the terminal satisfies a mobility condition for applying the type2-resource allocation scheme among the mobility conditions, the resource allocation scheme selected by the base station may be the type2-resource allocation scheme.

The operation method may further comprise receiving, from the base station, first mapping information between areas and resource pools and second mapping information between zones and resource pools, wherein the resource pool used for the sidelink communication is determined based on the first mapping information or the second mapping information.

The first message further may include position information of the terminal, the first mapping information may include information on the resource pool mapped to an area corresponding to the position information, and the second mapping information may include information on the resource pool mapped to a zone corresponding to the position information.

An operation method of a base station, according to a fourth exemplary embodiment of the present disclosure for achieving the objective, may comprise: receiving, from a terminal, a first message including mobility information of the terminal; selecting a resource allocation scheme for sidelink communication based on a result of comparing the mobility information and mobility conditions; and transmitting, to the terminal, a second message including information indicating the resource allocation scheme, wherein the resource allocation scheme is classified into a type1-resource allocation scheme and a type2-resource allocation scheme, and wherein in the type1-resource allocation scheme, the resource pool is configured based on an area including a plurality of zones, and in the type2-resource allocation scheme, the resource pool is configured based on a zone.

The mobility of the terminal may be a speed; when a speed of the terminal satisfies a mobility condition for applying the type1-resource allocation scheme among the mobility conditions, the selected resource allocation scheme may be the type1-resource allocation scheme; and when the speed of the terminal satisfies a mobility condition for applying the type2-resource allocation scheme among the mobility conditions, the selected resource allocation scheme may be the type2-resource allocation scheme.

The mobility of the terminal may be a speed change; when a speed change of the terminal satisfies a mobility condition for applying the type1-resource allocation scheme among the mobility conditions, the selected resource allocation scheme may be the type1-resource allocation scheme; and when the speed change of the terminal satisfies a mobility condition for applying the type2-resource allocation scheme among the mobility conditions, the selected resource allocation scheme may be the type2-resource allocation scheme.

The operation method may further comprise transmitting, to the terminal, first mapping information between areas and resource pools and second mapping information between zones and resource pools, wherein the resource pool used for the sidelink communication is determined based on the first mapping information or the second mapping information.

The first message may further include position information of the terminal, the first mapping information may include information on the resource pool mapped to an area corresponding to the position information, and the second mapping information may include information on the resource pool mapped to a zone corresponding to the position information.

According to the present disclosure, a resource allocation scheme for sidelink communication may be determined based on mobility information (e.g., speed, speed change) of a terminal. In a type1-resource allocation scheme, sidelink resources (e.g., resource pool) for each of areas may be configured, and in a type2-resource allocation scheme, sidelink resources for each of zones may be configured. When the speed of the terminal is equal to or greater than a threshold value, the type1-resource allocation scheme may be used, and when the speed of the terminal is less than the threshold value, the type2-resource allocation scheme may be used. Even when the type1-resource allocation scheme is used and a zone to which the terminal belongs is changed within the same area, the terminal can perform sidelink communication using the same resource pool (e.g., resource pool mapped to the area). Accordingly, the problem of collision between sidelink resources can be resolved, and the performance of the communication system can be improved.

DETAILED DESCRIPTION

Figure 1:
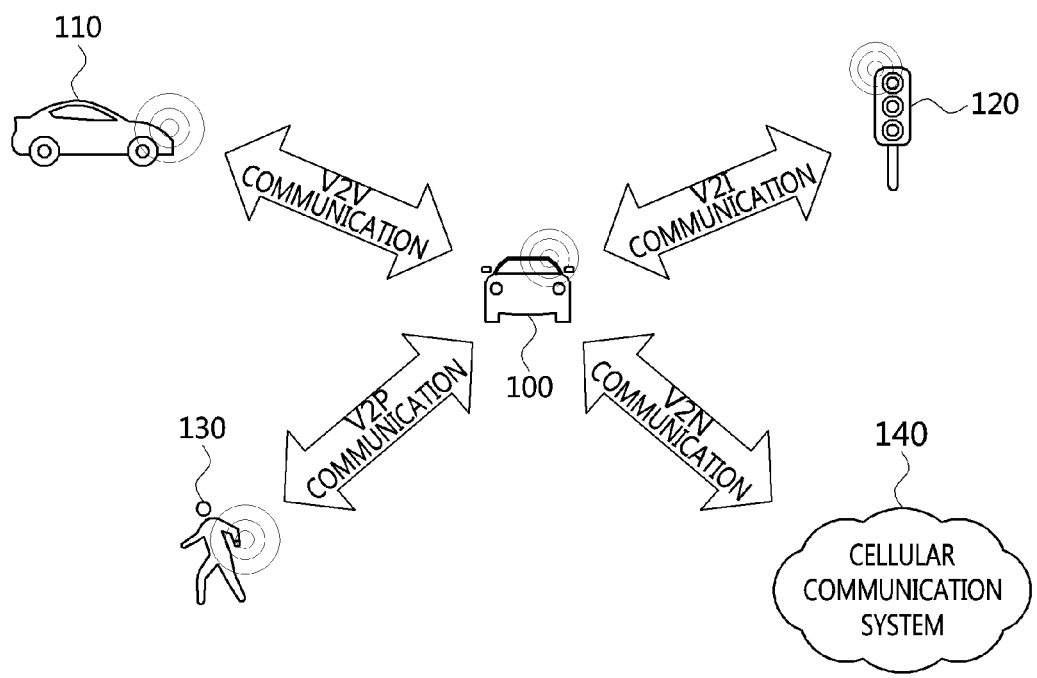
FIG. 1 is a conceptual diagram illustrating V2X communication scenarios.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like).

In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
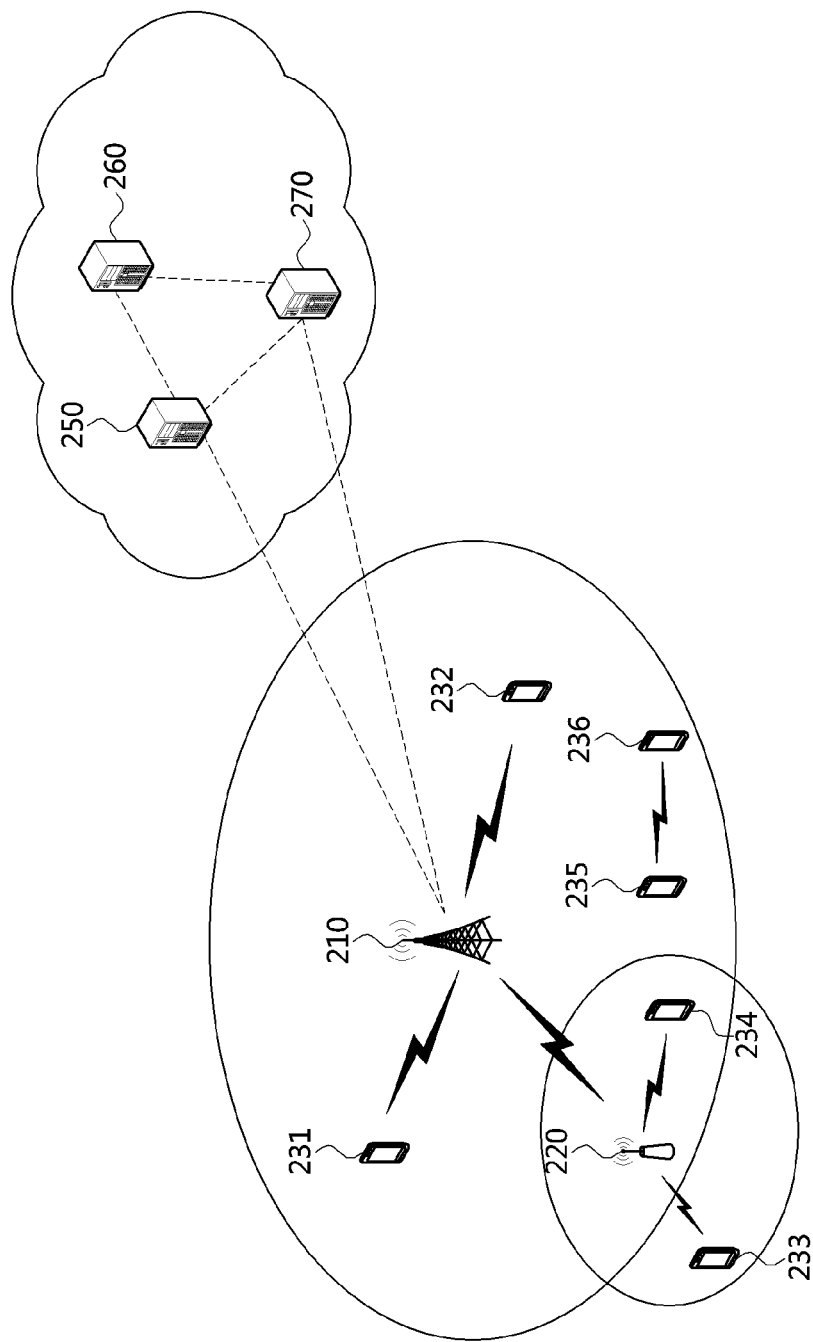
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like.

The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
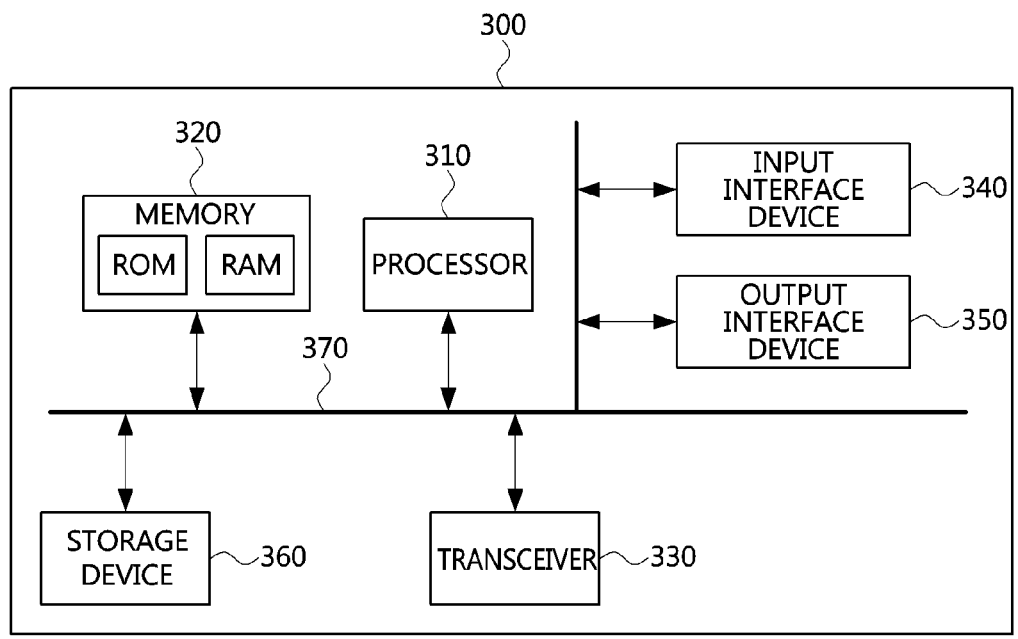
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
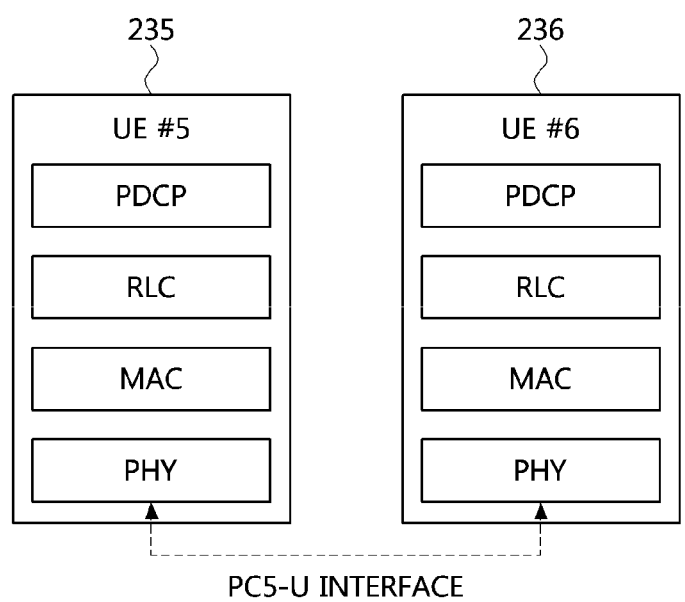
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
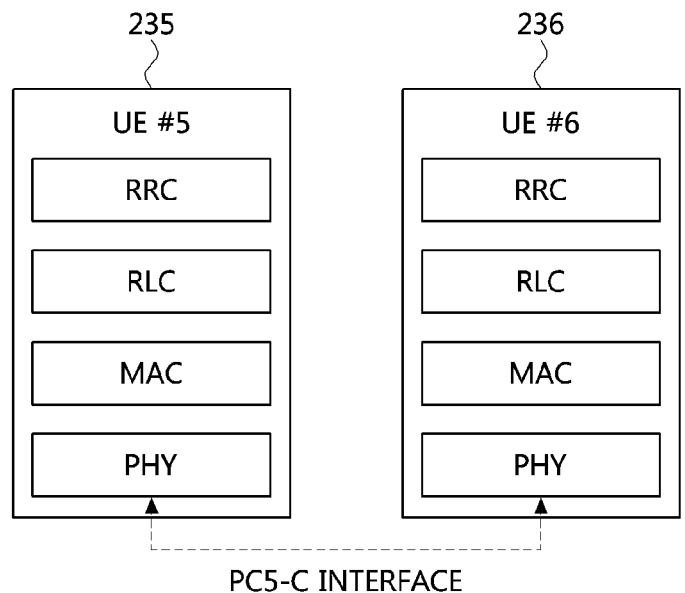
FIG. 5 is a block diagram illustrating a first exemplary embodiment of a control plane protocol stack of a UE performing sidelink communication.
Figure 6:
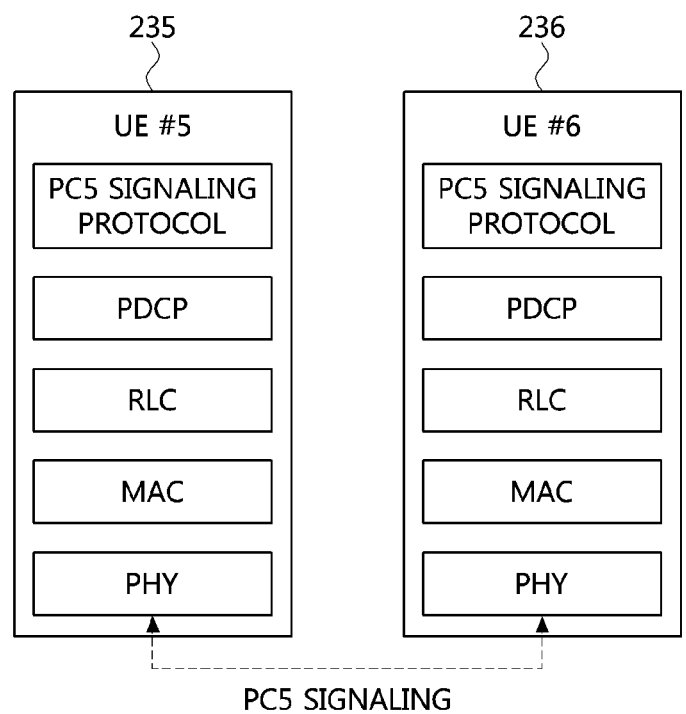
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink groupcast communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel.

The sidelink communication may support a broadcast service, a multicast service, a groupcast service, and a unicast service.

Meanwhile, zones for sidelink communication may be configured. A zone may be a geographic zone. Sidelink resources (e.g., resource pool) for each of the zones may be configured. That is, a mapping relationship between zones and sidelink resources may be configured. The base station may configure the zones, and may configure sidelink resources mapped to each of the zones. Alternatively, the zones may be predefined in a technical specification. The zones may be configured as follows.

Figure 7:
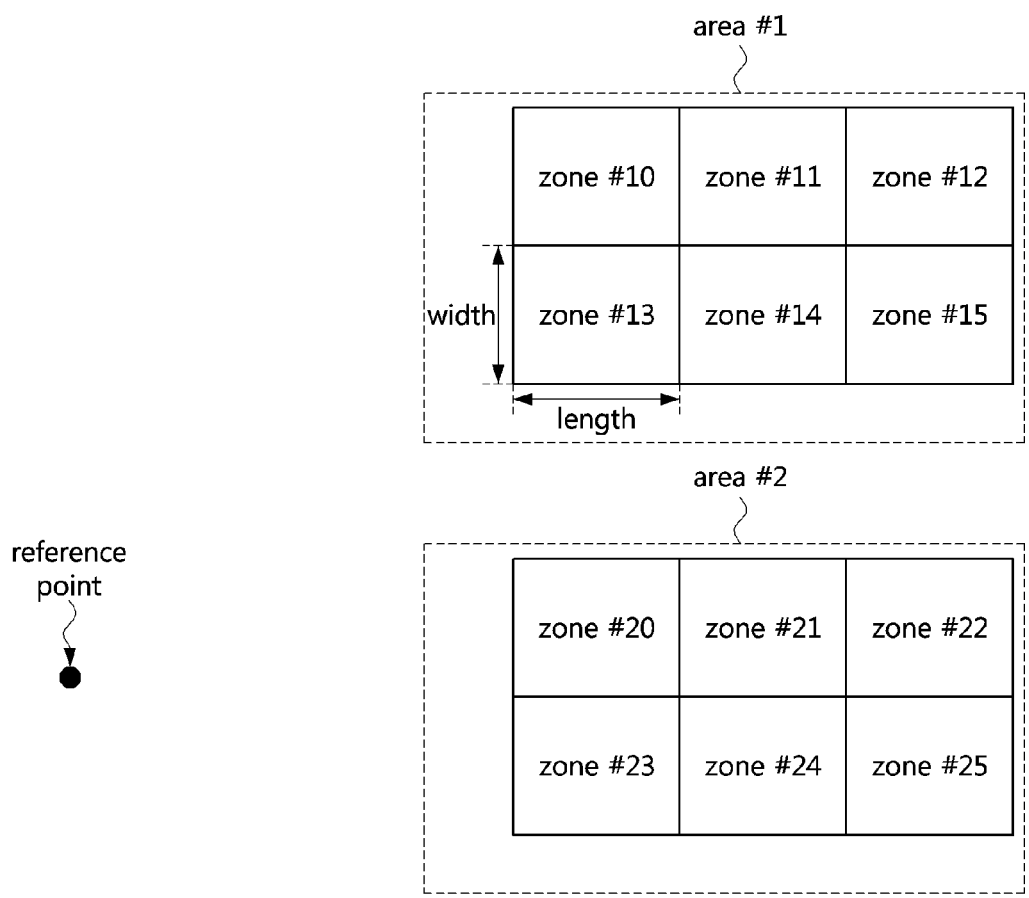
FIG. 7 is a conceptual diagram illustrating a first exemplary embodiment of zones in a cellular communication system.

FIG. 7 is a conceptual diagram illustrating a first exemplary embodiment of zones in a cellular communication system.

As shown in FIG. 7, a plurality of zones may be configured, and a single reference point unique in the world may be configured for the plurality of zones. The reference point may be a fixed point. The geographic coordinate of the reference point may be set to (0, 0). The geographic coordinates of the respective zones may be expressed based on the reference point. An area may consist of one or more zones. For example, an area #1 may include zones #10 to #15, and an area #2 may include zones #20 to #25. Different resources (e.g., different resource pools) may be mapped between adjacent zones. Each of the areas #1 and #2 may be a tracking area (TA) or a validity area. Also, the same system information may be used within one area. The zone may have a length and a width. A zone identifier (ID) may be determined based on a length of the zone, a width of the zone, the number of zones, the reference point, geographic coordinates of a terminal, and the like. The number of zones may include the number of zones located in the first direction (e.g., longitudinal direction) and the number of zones located in the second direction (e.g., width direction). A modulo operation may be performed to determine a zone ID.

When the terminal is located within coverage of a base station, the base station may transmit configuration information of the zones to the terminal. The configuration information of the zones may include the length of the zone, the width of the zone, the number of the zones, and the like. The terminal located outside the coverage of the base station may use predefined configuration information of the zones (e.g., the length of the zone, the width of the zone, the number of zones, and the like) predefined in the technical specification.

Meanwhile, the base station may transmit, to the terminal, configuration information (e.g., reporting periodicity) for reporting geographic position information (e.g., geographic coordinate) of the terminal. A terminal (e.g., terminal operating in an RRC connected state within the coverage of the base station) may receive, from the base station, the configuration information for geographic position information reporting, and based on the configuration information, may report its current geographic position information to the base station. The geographic position information of the terminal may be transmitted according to a preset periodicity.

The base station may receive the geographic position information from the terminal, and may identify a zone to which the terminal belongs based on the geographic position information. The base station may transmit system information (e.g., system information block (SIB) 21) including information on resources (e.g., resource pool) mapped to the zone to which the terminal belongs. The terminal may receive the system information from the base station, and may identify information on the resources mapped to the zone to which the terminal belongs based on the system information. The terminal may perform sidelink communication using the resources (e.g., resource pool) indicated by the system information.

A terminal located outside the coverage of the base station may identify resources (e.g., resource pool) mapped to a zone to which the terminal belongs based on a mapping relationship between zones and resources defined in the technical specification. The terminal may perform sidelink communication using the identified resources.

Meanwhile, when a terminal moves at a high speed, the terminal may not know information on resources mapped to a zone to which it belongs at the time of performing sidelink communication. For example, a terminal located in the zone #14 may perform sidelink communication based on information on resources (e.g., resource pool mapped to the zone #14) received from the base station, and then, may move to the zone #12. Since the geographic position information of the terminal is periodically reported to the base station, even if the terminal is located in the zone #12, it may not be able to report its geographic position information (i.e., changed geographic position information) to the base station before a next reporting period. In this case, since the terminal cannot obtain information on resources mapped to the zone #12 from the base station, the terminal may perform sidelink communication in the zone #12 using the resources mapped to the previous zone (i.e., zone #14). Due to this reason, a collision between sidelink resources may occur, and the performance of sidelink communication may be deteriorated.

In order to solve such the problem, a resource allocation scheme may vary according to the speed of the terminal. The resource allocation scheme may be classified into a type1-resource allocation scheme and a type2-resource allocation scheme.

The type1-resource allocation scheme may be a scheme of allocating sidelink resources (e.g., resource pool) on an area basis. An area may include a plurality of zones. For example, the area #1 shown in FIG. 7 may include the zones #10 to #15, and the area #2 shown in FIG. 7 may include the zones #20 to #25. When the type1-resource allocation scheme is used, different sidelink resources may be configured for the respective areas, and the same sidelink resources may be configured for the zones belonging to the same area. The terminal may use sidelink resources mapped to an area in which the terminal is located. In the exemplary embodiment shown in FIG. 7, even when a zone in which the terminal is located is changed from the zone #14 to the zone #12, since the area to which the terminal belongs does not change from the area #1, the terminal may use the same sidelink resources despite the change of zone.

The type2-resource allocation scheme may be a scheme of allocating sidelink resources (e.g., resource pool) on a zone basis. When the type2-resource allocation scheme is used, different sidelink resources may be configured for the respective zones. The terminal may use sidelink resources mapped to a zone in which the terminal is located. Sidelink communication based on the type1-resource allocation scheme or the type2-resource allocation scheme may be performed as follows.

Figure 8:
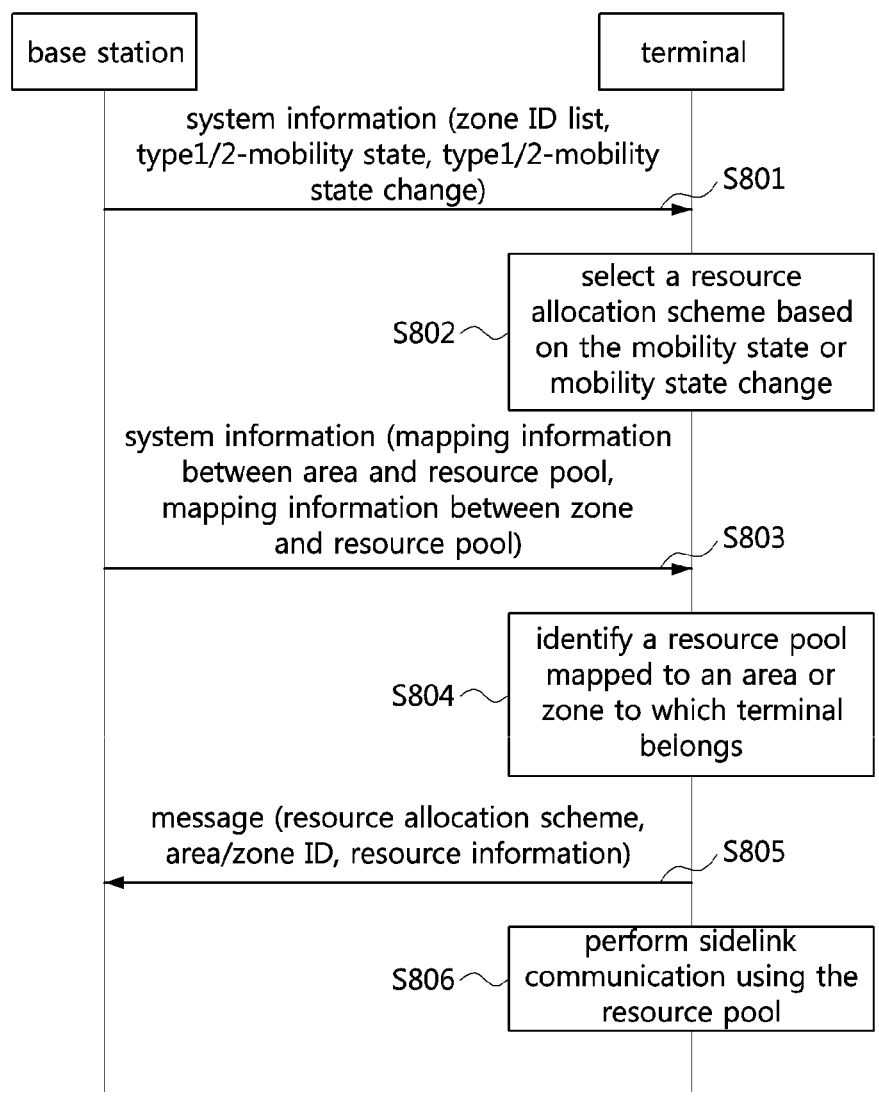
FIG. 8 is a sequence chart illustrating a first exemplary embodiment of a sidelink communication method according to a speed of a terminal.

FIG. 8 is a sequence chart illustrating a first exemplary embodiment of a sidelink communication method according to a speed of a terminal.

As shown in FIG. 8, a communication system may include a base station and a terminal. The base station may be the base station 210 shown in FIG. 2, and the terminal may be the UE 235 or UE 236 shown in FIG. 2. The base station and the terminal may be configured identically or similarly to the communication node 300 shown in FIG. 3. The terminal may support the protocol stacks shown in FIGS. 4 to 6. The terminal may be connected to the base station and may perform sidelink communication based on scheduling of the base station. Alternatively, the terminal may be located outside the coverage of the base station, and may perform sidelink communication without scheduling of the base station.

The base station may generate system information (e.g., SIB1, SIB21, or SIB 26) including one or more information elements described in Table 3 below. The base station may transmit the system information to the terminal (S801). The system information may include mobility conditions (e.g., type1-mobility state, type2-mobility state, type1-mobility state change, type2-mobility state change) used to select a resource allocation scheme (e.g., type1-resource allocation scheme or type2-resource allocation scheme) applied to the terminal. The mobility conditions may include 'type1-mobility state and type2-mobility state', 'type1-mobility state change and type2-mobility state change', or 'type1-mobility state, type2-mobility state, type1-mobility state change, and type2-mobility state change'.

TABLE 3

| Information elements | Description |
| --- | --- |
| Zone ID list | List of IDs of zones belonging to the same area |
| Type1-mobility state | Mobility state (e.g., speed) of a terminal for which the type 1-resource allocation scheme is to be used |
| Type2-mobility state | Mobility state (e.g., speed) of a terminal for which the type2-resource allocation scheme is to be used |
| Type1-mobility state change | Mobility state change (e.g., speed change) of a terminal for which the type1-resource allocation scheme is to be used |
| Type2-mobility state change | Mobility state change (e.g., speed change) of a terminal for which the type2-resource allocation scheme is to be used |
| Speed threshold | Threshold used for determining mobility state of a terminal |

The mobility state (i.e., speed) of the terminal may be classified into two states (e.g., high speed, low speed) or three states (e.g., high speed, medium speed, low speed). When the mobility state is classified into two states, the type1-mobility state may be the high-speed, and the type 2-mobility state may be the low-speed. In this case, one speed threshold may be configured, a speed equal to or greater than the speed threshold may be determined as the high speed, and a speed less than the speed threshold may be determined as the low speed. Also, the type1-mobility state change may be 'low speed→high speed', and the type2-mobility state change may be 'high speed→low speed'.

When the mobility state is classified into three states, the type1-mobility state may be the high speed, and the type2-mobility state may be the medium speed and the low speed. In this case, two speed thresholds may be configured, a speed equal to or greater than a speed threshold #1 may be determined as the high speed, a speed less than the speed threshold #1 and equal to or greater than a speed threshold #2 may be determined as the medium speed, and a speed less than the speed threshold #2 may be determined as the low speed. Also, the type1-mobility state change may be 'low speed→high speed' or 'medium speed→high speed', and the type 2 mobility state change may be 'high speed→medium speed', 'high speed→low speed', 'medium speed→low speed', or 'low speed→medium speed'. The mobility state change may be a change in a speed measured in a measurement period (e.g., two measurement points) preconfigured by the base station. Information on the preconfigured measurement period (e.g., two measurement points) may be included in the system information transmitted in the step S801.

Alternatively, when the mobility state is classified into three states, the type1-mobility state may be the high-speed and the medium-speed, and the type2-mobility state may be the low-speed. In this case, two speed thresholds may be configured, a speed equal to or greater than a speed threshold #1 may be determined as the high speed, a speed less than the speed threshold #1 and equal to or greater than a speed threshold #2 may be determined as the medium speed, and a speed less than the speed threshold #2 may be determined as the low speed. Also, the type1-mobility state change may be 'low speed→medium speed', 'low speed→high speed', or 'medium speed→high speed', and the type2-mobility state change may be 'high speed→low speed' or 'medium speed→low speed'.

System information (e.g., SI-SchedulingInfo in system information) including one or more information elements described in Table 3 may be configured as shown in Tables 4 to 6 below. In Table 4, ListofZoneIDsAssociatedwithAreaID may be the list of zone IDs, AreaApplyState may be the type1-mobility state, ZoneApplyState may be the type2-mobility state, AreaApplyStateTransition may be the type1-mobility state change, ZoneApplyStateTransition may be the type2-mobility state change, and SpeedThreshold may be the speed threshold.

TABLE 4

```
-- ASN1START
-- TAG-OTHER-SI-INFO-START
SI-SchedulingInfo ::=               SEQUENCE {
    schedulingInfoList                  SEQUENCE (SIZE (1..maxSI-Message))              OF
SchedulingInfo,
    si-WindowLength                     ENUMERATED {s5, s10, s20, s40, s80, s160, s320, s640,
s1280},
    si-RequestConfig                    SI-RequestConfig              OPTIONAL,    -- Cond
MSG-1
    si-RequestConfigSUL                 SI-RequestConfig              OPTIONAL,    --
Cond SUL-MSG-1
    systemInformationAreaID             BIT STRING (SIZE (24))        OPTIONAL,    -- Need R
    ListofZoneIDsAssociatedwithAreaID       ENUMERATED {ZoneID1,                      ZoneID2,
ZoneID3 ..., },
    AreaApplyState                      ENUMERATED {HighMobilityState },
```

TABLE 4-continued

```
ZoneApplyState                ENUMERATED {Medium MobilityState, LowMobilityState },
AreaApplyStateTransition      ENUMERATED {MediumMobilityState          to
HighMobilityState. NormalMobilityState to HighMobilityState },
ZoneApplyStateTransition      ENUMERATED {HighMobilityState to    MediumMobilityState,
HighMobilityState to NormalMobilityState,
                              NormalMobilityState to            MediumMobilityState,
MediumMobilityState to NormalMobilityState},
...
}
```

TABLE 5

```
SchedulingInfo ::=       SEQUENCE {
    si-BroadcastStatus     ENUMERATED {broadcasting, notBroadcasting},
    si-Periodicity         ENUMERATED {rf8, rf16, rf32, rf64, rf128, rf256, rf512},
    sib-MappingInfo        SIB-Mapping
}
SIB-Mapping ::=          SEQUENCE (SIZE (1..maxSIB)) OF SIB-TypeInfo
SIB-TypeInfo ::=         SEQUENCE {
    Type                   ENUMERATED {sibType2, sibType3, sibType4, sibType5,
sibType6,              sibType7,  sibType8,   sibType9,
                           spare8, spare7, spare6, spare5,
spare4, spare3, spare2, spare1,... },
    valueTag               INTEGER (0..31)         OPTIONAL, -- Cond SIB-
TYPE
    areaScope              ENUMERATED {true}       OPTIONAL -- Need S
}
```

TABLE 6

```
-- Configuration for Msg1 based SI Request
SI-RequestConfig::=        SEQUENCE {
    rach-OccasionsSI          SEQUENCE {
        rach-ConfigSI             RACH-ConfigGeneric,
        ssb-perRACH-Occasion      ENUMERATED {oneEighth, oneFourth,
oneHalf, one, two, four, eight, sixteen}
    }                         OPTIONAL,       -- Need R
    si-RequestPeriod          ENUMERATED {one, two, four, six, eight, ten,
twelve, sixteen}          OPTIONAL,       -- Need R
    si-RequestResources       SEQUENCE (SIZE (1..maxSI-Message)) OF SI-
RequestResources
}
SI-RequestResources ::=    SEQUENCE {
    ra-PreambleStartIndex     INTEGER (0..63),
    ra-AssociationPeriodIndex INTEGER (0..15) OPTIONAL,       --
Need R
    ra-ssb-OccasionMaskIndex  INTEGER (0..15) OPTIONAL        --
Need R
}
-- TAG-OTHER-SI-INFO-STOP
-- ASN1STOP
```

The terminal may receive system information from the base station, and may identify information elements (e.g., information elements listed in Table 3) included in the system information. For example, the terminal may determine its mobility state (e.g., high speed, medium speed, or low speed), and may select a resource allocation scheme (e.g., type1-resource allocation scheme or type2-resource allocation scheme) to be used based on the mobility state (S802). When the mobility state of the terminal is the type1-mobility state, the terminal may determine that the type1-resource allocation scheme is to be used for sidelink communication. When the mobility state of the terminal is the type2-mobility state, the terminal may determine that the type2-resource allocation scheme is to be used for sidelink communication.

Alternatively, the terminal may determine its mobility state change (e.g., 'low speed→medium speed', 'low speed→high speed', 'medium speed→high speed', 'medium speed→low speed', 'high speed→medium speed', or 'high speed→low speed'), and may select a resource allocation scheme (e.g., type1-resource allocation scheme or type2-resource allocation scheme) based on the mobility state change (S802). When the mobility state change of the terminal is the type1-mobility state change, the terminal may determine that the type1-resource allocation scheme is to be used for sidelink communication. When the mobility state change of the terminal is the type2-mobility state change, the terminal may determine that the type2-resource allocation scheme is to be used for sidelink communication.

Meanwhile, the base station may configure sidelink resources (e.g., resource pool) for each of the zones and sidelink resources (e.g., resource pool) for each of the areas. In the type1-resource allocation scheme, sidelink resources for the respective areas may be configured differently, sidelink resources for zones belonging to the same area may be the same, and sidelink resources for zones belonging to different areas may be different. In the type2-resource allocation scheme, sidelink resources for the respective zones may be configured differently.

The base station may transmit system information (e.g., SIB1, SIB21, SIB26) including 'mapping information between zone and sidelink resource' and/or 'mapping information between area and sidelink resource' to the terminal (S803) The mapping information between zone and sidelink resource may include an identifier (e.g., zone ID) of a zone, information on sidelink resources mapped to the zone, and the like. The mapping information between area and sidelink resource may include an identifier (e.g., area ID) of an area, a list of zones belonging to the area, information on sidelink resources mapped to the area, and the like. The terminal may identify the mapping information between zone and sidelink resource and/or the mapping information between area and sidelink resource by receiving the system information from the base station.

The mapping information between zone and sidelink resource and/or the mapping information between area and sidelink resource may be transmitted in the step S801. In this case, the terminal may perform the step S802 after identifying the mapping information between zone and sidelink resource and/or the mapping information between area and sidelink resource, which are included in the system information.

When the type1-resource allocation scheme is selected in the step S802, the terminal may identify an area to which the terminal belongs, and identify sidelink resources (e.g., resource pool) mapped to the area to which the terminal belongs based on the system information (S804). When the type2-resource allocation scheme is selected in the step S802, the terminal may identify a zone to which the terminal belongs, and identify sidelink resources (e.g., resource pool) mapped to the zone to which the terminal belongs based on the system information (S804).

In addition, the terminal may generate a message including one or more information elements shown in Table 7 below, and may transmit the generated message to the base station (S805). The step S805 may be selectively performed. The message transmitted in the step S805 may be sidelink UE information or UE assistance information. The base station may identify one or more information elements listed in Table 7 below by receiving the message from the terminal.

TABLE 7

| Information elements | Description |
| --- | --- |
| Resource allocation scheme | A resource allocation scheme (e.g., type1-resource allocation scheme or type2-resource allocation scheme) selected by the terminal |
| Area identifier | Information (e.g., area ID) indicating an area to which the terminal belongs |
| Zone identifier | Information (e.g., zone ID) indicating a zone to which the terminal belongs |
| Resource information | Information on resources (e.g., resource pool) mapped to the area or zone to which the terminal belongs |

The terminal may perform sidelink communication using sidelink resources (e.g., resource pool) mapped to the area or zone to which the terminal belongs (S806). While performing the sidelink communication, the terminal may inform the base station of its geographic position information according to a preset periodicity.

Figure 9:
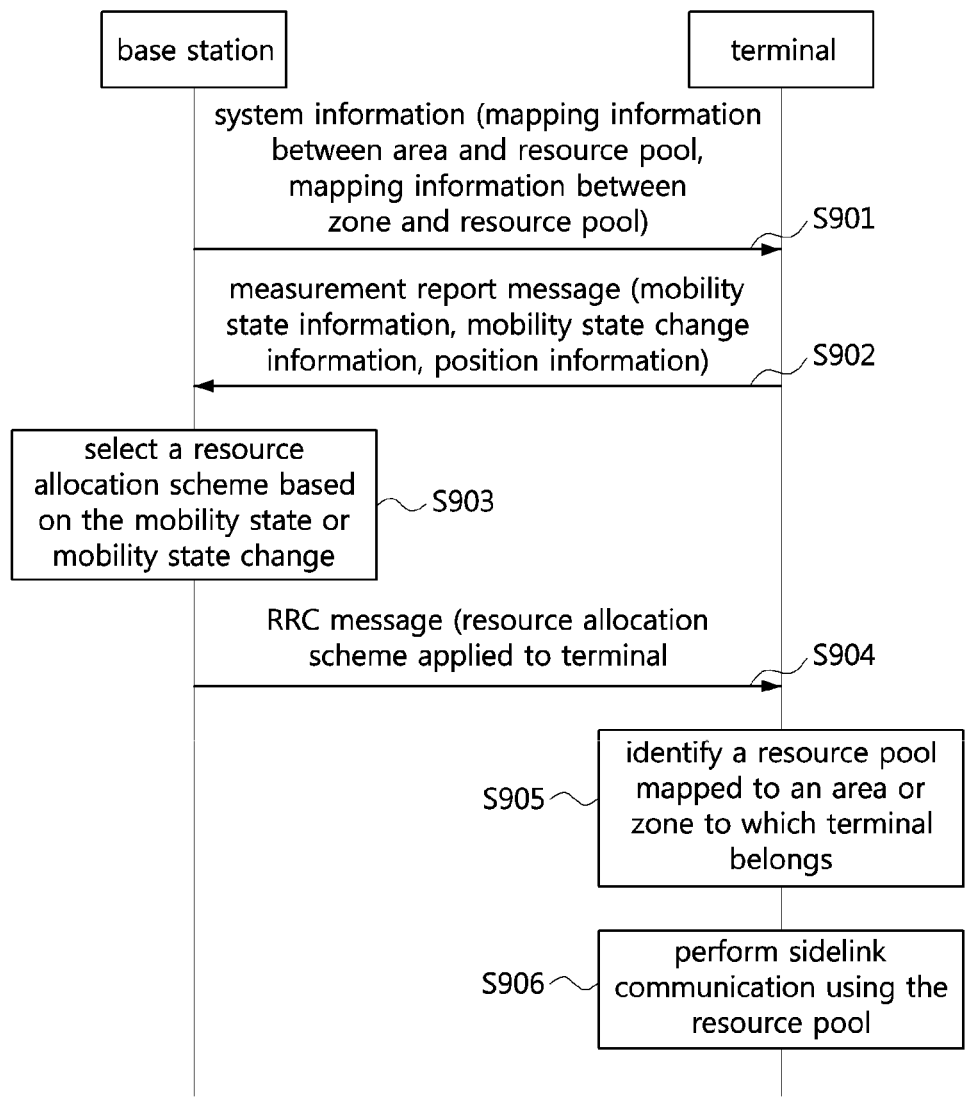
FIG. 9 is a sequence chart illustrating a second exemplary embodiment of a sidelink communication method according to a speed of a terminal.

FIG. 9 is a sequence chart illustrating a second exemplary embodiment of a sidelink communication method according to a speed of a terminal.

As shown in FIG. 9, a communication system may include a base station and a terminal. The base station may be the base station 210 shown in FIG. 2, and the terminal may be the UE 235 or UE 236 shown in FIG. 2. The base station and the terminal may be configured identically or similarly to the communication node 300 shown in FIG. 3. The terminal may support the protocol stacks shown in FIGS. 4 to 6. The terminal may be connected to the base station and may perform sidelink communication based on scheduling of the base station. Alternatively, the terminal may be located outside the coverage of the base station, and may perform sidelink communication without scheduling of the base station.

The base station may transmit system information (e.g., SIB1, SIB21, SIB26) including mapping information between zone and sidelink resource and/or mapping information between area and sidelink resource to the terminal (S901). The mapping information between zone and sidelink resource and/or the mapping information between area and sidelink resource may be transmitted through an RRC connection reconfiguration message instead of the system information. Alternatively, the mapping information between zone and sidelink resource and/or the mapping information between area and sidelink resource may be transmitted in the step S904.

The mapping information between zone and sidelink resource may include an identifier (e.g., zone ID) of a zone, information on sidelink resources mapped to the zone, and the like. The mapping information between area and sidelink resource may include an identifier (e.g., area ID) of an area, a list of zones belonging to the area, information on sidelink resources mapped to the area, and the like. The terminal may identify the mapping information between zone and sidelink resource and/or the mapping information between area and sidelink resource by receiving the system information from the base station.

The terminal may transmit a measurement report message including mobility state information or mobility state change information to the base station (S902). In addition, the measurement report message may further include position information of the terminal. The position information of the terminal may include at least one of a geographic position, a movement path, a movement direction, or combinations thereof. The measurement report message may be transmitted according to a preset periodicity. The measurement report message may be sidelink UE information or UE assistance information.

The mobility state information may be a speed of the terminal. When a speed threshold is preconfigured by the base station, the terminal may determine its own speed as the high speed, medium speed, or low speed. When the speed of the terminal is classified into two speeds (e.g., high speed or low speed), the mobility state information may indicate the high speed or low speed. When the speed of the terminal is classified into three speeds (e.g., high speed, medium speed, or low speed), the mobility state information may indicate the high speed, medium speed, or low speed.

The mobility state change may be a speed change of the terminal. When the speed threshold and a measurement period (e.g., measurement points) are preconfigured by the base station, the terminal may determine its speed change as 'low speed→medium speed', 'low speed→high speed', 'medium speed→high speed', 'medium speed→low speed', 'high speed→medium speed', or 'high speed→low speed'. When the speed of the terminal is classified into two speeds (e.g., high speed or low speed), the mobility state change information may indicate 'low speed→high speed' or 'high speed→low speed'. When the speed of the terminal is classified into three speeds (e.g., high speed, medium speed, or low speed), the mobility state change information may indicate 'low speed→medium speed', 'low speed→high speed', 'medium speed→high speed', 'medium speed→low speed', 'high speed→medium speed', or 'high speed→low speed'.

The measurement report message may include one or more information elements listed in Tables 8 to 11 below. MobiltiyState in Table 9 may be the mobility state information, and MobilityStateTransition in Table 9 may be the mobility state change information.

TABLE 8

```
-- ASN1START
UEAssistanceInformation-r11 ::=          SEQUENCE {
    criticalExtensions                   CHOICE {
        c1                               CHOICE {
            ueAssistanceInformation-r11      UEAssistanceInformation-r11-IEs,
            spare3 NULL, spare2 NULL, spare1 NULL
        },
        criticalExtensionsFuture         SEQUENCE { }
    }
}
UEAssistanceInformation-r11-IEs ::=      SEQUENCE {
    powerPrefIndication-r11              ENUMERATED {normal,
lowPowerConsumption}                     OPTIONAL,
    lateNonCriticalExtension             OCTET STRING
    OPTIONAL,
    nonCriticalExtension                 UEAssistanceInformation-v1430-IEs
    OPTIONAL
}
UEAssistanceInformation-v1430-IEs ::=    SEQUENCE {
    bw-Preference-r14                    BW-Preference-
r14                                      OPTIONAL,
    sps-AssistanceInformation-r14        SEQUENCE {
        trafficPatternInfoListSL-r14         TrafficPatternInfoList-r14
    OPTIONAL,
        trafficPatternInfoListUL-r14         TrafficPatternInfoList-r14
    OPTIONAL
    }                                    OPTIONAL,
    rlm-Report-r14                       SEQUENCE {
        rlm-Event-r14                        ENUMERATED {earlyOutOfSync,
earlyInSync},
        excessRep-MPDCCH-r14                 ENUMERATED {excessRep1,
excessRep2}                              OPTIONAL
    }
    OPTIONAL,
    delayBudgetReport-r14                DelayBudgetReport-
r14                                      OPTIONAL,
    nonCriticalExtension                 UEAssistanceInformation-v1450-IEs
    OPTIONAL
}
```

TABLE 9

```
UEAssistanceInformation-v1450-IEs ::=    SEQUENCE {
    overheatingAssistance-r14                    OverheatingAssistance-
r14                                      OPTIONAL,
    nonCriticalExtension                 UEAssistanceInformation-v1530-IEs
    OPTIONAL
}
UEAssistanceInformation-v1530-IEs ::=    SEQUENCE {
    sps-AssistanceInformation-v1530              SEQUENCE {
        trafficPatternInfoListSL-v1530               TrafficPatternInfoList-v1530
    }                                    OPTIONAL,
    nonCriticalExtension                 SEQUENCE { }
    OPTIONAL
}
UEAssistanceInformation-v16-IEs ::= SEQUENCE {
    MobiltiyState                        ENUMERATED {High-MobilityState, Medium-MobilityState,
Normal-MobilityState },
    MobilityStateTransition              ENUMERATED     {MediumMobilityState     to
HighMobilityState. NormalMobilityState to HighMobilityState,
```

TABLE 9-continued

```
    HighMobilityState to MediumMobilityState,              HighMobilityState    to
NormalMobilityState, NormalMobilityState to MediumMobilityState,
    MediumMobilityState to NormalMobilityState},
    nonCriticalExtension                   SEQUENCE { }
OPTIONAL
}
BW-Preference-r14 ::= SEQUENCE {
    dl-Preference-r14                      ENUMERATED         {mhz1dot4,        mhz5,   mhz20
}                                          OPTIONAL,
    ul-Preference-r14                      ENUMERATED         {mhz1dot4.
mhz5}                                      OPTIONAL
}
```

TABLE 10

```
TrafficPatternInfoList-r14 ::= SEQUENCE (SIZE (1..maxTrafficPattern-r14))           OF
TrafficPatternInfo-r14
TrafficPatternInfo-r14 ::= SEQUENCE {
    trafficPeriodicity-r14          ENUMERATED {
                                    sf20, sf50, sf100, sf200, sf300, sf400, sf500,
                                    sf600, sf700, sf800, sf900, sf1000},
    timingOffset-r14                INTEGER (0..10239),
    priorityInfoSL-r14              SL-Priority-r13
OPTIONAL,
    logicalChannelIdentityUL-r14    INTEGER (3..10)
OPTIONAL,
    messageSize-r14                 BIT STRING (SIZE (6))
}
TrafficPatternInfoList-v1530 ::=    SEQUENCE (SIZE (1..maxTrafficPattern-r14))      OF
TrafficPatternInfo-v1530
TrafficPatternInfo-v1530 ::= SEQUENCE {
    trafficDestination-r15          SL-DestinationIdentity-r12
OPTIONAL,
    reliabilityInfoSL-r15           SL-Reliability-r15                              OPTIONAL
}
```

TABLE 11

```
DelayBudgetReport-r14::=        CHOICE {
    type1                       ENUMERATED {
                                    msMinus1280, msMinus640, msMinus320,
msMinus160,
                                    msMinus80, msMinus60, msMinus40,
msMinus20, ms0, ms20,                                           ms40,           ms60,
ms80, ms160, ms320, ms640, ms1280},
    type2                       ENUMERATED {
                                    msMinus192,              msMinus168,msMinus144,
msMinus120,
                                    msMinus96,          msMinus72, msMinus48,
msMinus24, ms0, ms24,                                           ms48,           ms72,
ms96, ms120, ms144, ms168, ms192}
}
OverheatingAssistance-r14 ::=   SEQUENCE {
    reducedUE-Category          SEQUENCE {
        reducedUE-CategoryDL        INTEGER (0..19),
        reducedUE-CategoryUL        INTEGER (0..21)
    }                           OPTIONAL,
    reducedMaxCCs               SEQUENCE {
        reducedCCsDL                INTEGER (0..31),
        reducedCCsUL                INTEGER (0..31)
    }                           OPTIONAL
}
-- ASN1STOP
```

The base station may receive the measurement report message from the terminal, and based on the mobility state information or the mobility state change information included in the measurement report message, may select a resource allocation scheme (e.g., type1-resource allocation scheme or type2-resource allocation scheme) to be applied to the terminal. For example, when the speed of the terminal is the high speed, or when the speed change of the terminal is 'medium speed→high speed' or 'low speed→high speed', the base station may determine that the type1-resource allocation scheme is to be applied to the terminal. When the speed of the terminal is the medium speed or the low speed, or when the speed change of the terminal is 'high speed→medium speed', 'high speed→low speed', 'medium speed→low speed', or 'low speed→medium speed', the base station may determine that the type2-resource allocation scheme is to be applied to the terminal.

The base station may generate an RRC message including information indicating the resource allocation scheme to be applied to the terminal, and may transmit the RRC message to the terminal (S904). The RRC message may be an RRC connection reconfiguration message. The RRC message may further include the mapping information between zone and sidelink resource and/or the mapping information between area and sidelink resource. The base station that knows the position information (e.g., geographic position, movement direction) of the terminal may estimate a zone or area to which the terminal belongs. Accordingly, the RRC message transmitted in the step S904 may include information on sidelink resources mapped to the zone to which the terminal belongs or information on sidelink resources mapped to the area to which the terminal belongs.

In the 4G communication system (e.g., LTE communication system), the RRC message may include one or more information elements listed in Tables 12 and 13 below, and in the 5G communication system (e.g., NR communication system), the RRC message may include one or more information elements listed in Tables 14 and 15 below. V2X-AppliedAreaConfig in Tables 13 and 15 may indicate the resource allocation scheme to be applied to the terminal. V2X-AppliedAreaConfig set to 'ValidityArea' may indicate that the type1-resource allocation scheme is to be used, and V2X-AppliedAreaConfig set to 'Zone' may indicate that the type2-resource allocation scheme is to be used.

TABLE 12

```
-- ASN1START
RRCConnectionReconfiguration ::=         SEQUENCE {
    rrc-TransactionIdentifier              RRC-TransactionIdentifier,
    criticalExtensions                     CHOICE {
        c1                                   CHOICE{
            rrcConnectionReconfiguration-r8      RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture             SEQUENCE { }
    }
}
RRCConnectionReconfiguration-r8-IEs ::= SEQUENCE {
    measConfig                             MeasConfig                         OPTIONAL, -- Need ON
    mobilityControlInfo                    MobilityControlInfo                OPTIONAL, -- Cond HO
    dedicatedInfoNASList                   SEQUENCE  (SIZE(1..maxDRB)) OF DedicatedInfoNAS
                                           OPTIONAL, -- Cond nonHO
    radioResourceConfigDedicated           RadioResourceConfigDedicated       OPTIONAL, -- Cond HO-toEUTRA
    securityConfigHO                       SecurityConfigHO                   OPTIONAL, -- Cond HO-toEPC
    nonCriticalExtension                   RRCConnectionReconfiguration-v890-IEs   OPTIONAL
}
```

TABLE 13

```
RRCConnectionReconfiguration-v1530-IEs ::= SEQUENCE {
    securityConfigHO-v1530             SecurityConfigHO-v1530     OPTIONAL, -- Cond HO-5GC
    sCellGroupToReleaseList-r15        SCellGroupToReleaseList-r15    OPTIONAL, -- Need ON
    sCellGroupToAddModList-r15         SCellGroupToAddModList-r15     OPTIONAL, -- Need ON
    dedicatedInfoNASList-r15           SEQUENCE (SIZE(1..maxDRB-r15)) OF
                                                 DedicatedInfoNAS    OPTIONAL, -- Cond nonHO
    p-MaxUE-FR1-r15                    P-Max                          OPTIONAL, -- Need OR
    smtc-r15                           MTC-SSB-NR-r15                 OPTIONAL, -- Need OP
    nonCriticalExtension               RRCConnectionReconfiguration-v16-IEs   OPTIONAL
}
RRCConnectionReconfiguration-v16-IEs ::= SEQUENCE {
    V2X-AppliedAreaConfig              ENUMERATED {ValidityArea, Zone}   OPTIONAL, -- Need ON
    nonCriticalExtension               SEQUENCE { }                      OPTIONAL
}
-- ASN1STOP
```

TABLE 14

```
-- ASN1START
-- TAG-RRCRECONFIGURATION-START
RRCReconfiguration ::=                  SEQUENCE {
    rrc-TransactionIdentifier              RRC-TransactionIdentifier,
    criticalExtensions                     CHOICE {
        rrcReconfiguration                    RRCReconfiguration-IEs,
        criticalExtensionsFuture              SEQUENCE { }
    }
}
RRCReconfiguration-IEs ::=              SEQUENCE {
    radioBearerConfig                      RadioBearerConfig           OPTIONAL, -- Need M
    secondaryCellGroup                     OCTET          STRING          (CONTAINING CellGroupConfig)          OPTIONAL, -- Need M
    measConfig                             MeasConfig                  OPTIONAL, -- Need M
    lateNonCriticalExtension               OCTET STRING                OPTIONAL,
    nonCriticalExtension                   RRCReconfiguration-v1530-IEs   OPTIONAL
}
RRCReconfiguration-v1530-IEs ::=        SEQUENCE {
    masterCellGroup                        OCTET          STRING          (CONTAINING CellGroupConfig)          OPTIONAL, -- Need M
    fullConfig                             ENUMERATED {true}           OPTIONAL, -- Cond FullConfig
    dedicatedNAS-MessageList               SEQUENCE       (SIZE(1..maxDRB))   OF DedicatedNAS-Message           OPTIONAL, -- Cond nonHO
    masterKeyUpdate                        MasterKeyUpdate             OPTIONAL, -- Cond MasterKeyChange
    dedicatedSIB1-Delivery                 OCTET          STRING          (CONTAINING SIB1)          OPTIONAL, -- Need N
    dedicatedSystemInformationDelivery  OCTET          STRING          (CONTAINING SystemInformation)          OPTIONAL, -- Need N
    otherConfig                            OtherConfig                 OPTIONAL, -- Need M
    nonCriticalExtension                   RRCReconfiguration-v1540-IEs             OPTIONAL
}
```

TABLE 15

```
RRCReconfiguration-v1540-IEs ::=        SEQUENCE {
    otherConfig-v1540                      OtherConfig-v1540    OPTIONAL, -- Need M
    nonCriticalExtension                   RRCConnectionReconfiguration-v16-IEs         OPTIONAL
}
RRCConnectionReconfiguration-v16-IEs ::= SEQUENCE {
    V2X-AppliedAreaConfig                  ENUMERATED {ValidityArea, Zone}
    OPTIONAL,                              -- Need ON
    nonCriticalExtension                   SEQUENCE { }        OPTIONAL
}
MasterKeyUpdate ::=                     SEQUENCE {
    keySetChangeIndicator                  BOOLEAN,
    nextHopChainingCount                   NextHopChainingCount,
    nas-Container                          OCTET STRING        OPTIONAL, -- Cond securityNASC
    ...
}
-- TAG-RRCRECONFIGURATION-STOP
-- ASN1STOP
```

The terminal may receive the RRC message from the base station, and based on the information element (e.g., V2X-AppliedAreaConfig) included in the RRC message, may identify the resource allocation scheme (e.g., type1-resource allocation scheme or type2-resource allocation scheme) to be applied to itself. When the type1-resource allocation scheme is to be used, the terminal may identify an area to which the terminal belongs based on the current position (or, current position and movement direction), and may identify sidelink resources (e.g., resource pool) mapped to the area (e.g., area ID) in which the terminal is located based on the mapping information between area and sidelink resource (S905). When the type2-resource allocation scheme is to be used, the terminal may identify a zone to which the terminal belongs based on the current position (or, current position and movement direction), and may identify sidelink resources (e.g., resource pool) mapped to the zone (e.g., zone ID) in which the terminal is located based on the mapping information between zone and sidelink resource (S905).

Alternatively, when the base station knows the zone or area to which the terminal belongs, information on sidelink resources mapped to the zone or area to which the terminal belongs may be received in the step S904. In this case, the terminal may use the sidelink resources (e.g., resource pool) indicated by the RRC message received in the step S904.

The terminal may perform sidelink communication using the sidelink resources (e.g., resource pool) mapped to the area or zone to which the terminal belongs (S906). While performing the sidelink communication, the terminal may transmit at least one of its mobility state information, mobility state change information, position information, or combinations thereof to the base station according to a preset periodicity.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, a message including a speed threshold used to select a resource allocation scheme for sidelink communication;
   selecting the resource allocation scheme based on a result of comparing a speed of the terminal and the speed threshold;
   determining a sidelink resource based on the selected resource allocation scheme; and
   performing the sidelink communication using the determined sidelink resource,
   wherein the resource allocation scheme is classified into a type 1-resource allocation scheme and a type2-resource allocation scheme, and
   wherein a first sidelink resource determined based on the type1-resource allocation scheme is different from a second sidelink resource determined based on the type2-resource allocation scheme, and
   wherein, when the speed of the terminal is above the speed threshold, the selected resource allocation scheme is the type1-resource allocation scheme, and when the speed of the terminal is below the speed threshold, the selected resource allocation scheme is the type2-resource allocation scheme.

2. The operation method according to claim 1, further comprising transmitting, to the base station, an additional message including information indicating the selected resource allocation scheme.

3. An operation method of a base station in a communication system, the operation method comprising:
   transmitting, to a terminal, first information of a speed threshold used to select a resource allocation scheme for sidelink communication; and
   transmitting, to the terminal, second information of the resource allocation scheme according to the speed threshold,
   wherein the resource allocation scheme is classified into a type 1-resource allocation scheme and a type2-resource allocation scheme,
   wherein a first sidelink resource determined based on the type1-resource allocation scheme is different from a second sidelink resource determined based on the type2-resource allocation scheme, and
   wherein, when the speed of the terminal is above the speed threshold, the type1-resource allocation scheme is selected by the terminal, and when the speed of the terminal is below the speed threshold, the type2-resource allocation scheme is selected by the terminal.

4. The operation method according to claim 3, further comprising receiving, from the terminal, a message including information indicating the type 1-resource allocation scheme or the type2-resource allocation scheme selected by the terminal based on a result of comparing the speed of the terminal and the speed threshold.

5. An operation method of a terminal in a communication system, the operation method comprising:
   transmitting, to a base station, a first message including a speed of the terminal;
   receiving, from the base station, a second message including information indicating a resource allocation scheme selected based on a result of comparing the speed of the terminal and a speed threshold;
   determining a sidelink resource for sidelink communication based on the resource allocation scheme; and
   performing the sidelink communication using the sidelink resource,
   wherein the resource allocation scheme is classified into a type 1-resource allocation scheme and a type2-resource allocation scheme, and
   wherein a first sidelink resource determined based on the type1-resource allocation scheme is different from a second sidelink resource determined based on the type2-resource allocation scheme, and
   wherein, when the speed of the terminal is above the speed threshold, the resource allocation scheme selected by the base station is the type1-resource allocation scheme, and when the speed of the terminal is below the speed threshold, the resource allocation scheme selected by the base station is the type2-resource allocation scheme.

6. The operation method according to claim 5, wherein the first message further includes position information of the terminal.

7. An operation method of a base station in a communication system, the operation method comprising:
   receiving, from a terminal, a first message including a speed of the terminal;
   selecting a resource allocation scheme for sidelink communication based on a result of comparing the speed of the terminal and a speed threshold; and
   transmitting, to the terminal, a second message including information indicating the resource allocation scheme,
   wherein the resource allocation scheme is classified into a type 1-resource allocation scheme and a type2-resource allocation scheme, and
   wherein a first sidelink resource determined based on the type1-resource allocation scheme is different from a second sidelink resource determined based on the type2-resource allocation scheme, and wherein, when the speed of the terminal is above the speed threshold, the selected resource allocation scheme is the type1-resource allocation scheme, and when the speed of the terminal is below the speed threshold, the selected resource allocation scheme is the type2-resource allocation scheme.

8. The operation method according to claim 7, wherein the first message further includes position information of the terminal.

\* \* \* \* \*